(12) United States Patent
Hoogenboom

(10) Patent No.: US 7,312,703 B2
(45) Date of Patent: Dec. 25, 2007

(54) INITIALIZATION OF A SENSOR FOR MONITORING THE STRUCTURAL INTEGRITY OF A BUILDING

(76) Inventor: Christopher L. Hoogenboom, 2230 Peninsula Rd., Oxnard, CA (US) 93035

( * ) Notice: Subject to any disclaimer, the term of this patent is extended or adjusted under 35 U.S.C. 154(b) by 217 days.

(21) Appl. No.: 11/254,953

(22) Filed: Oct. 20, 2005

(65) Prior Publication Data

US 2007/0093991 A1    Apr. 26, 2007

(51) Int. Cl.
*G08B 21/00* (2006.01)
*G08B 9/00* (2006.01)
*G06F 9/44* (2006.01)

(52) U.S. Cl. ............ 340/540; 340/635; 340/286.02; 717/100; 717/166; 717/167; 717/217; 717/218; 717/219

(58) Field of Classification Search ............ None
See application file for complete search history.

(56) References Cited

U.S. PATENT DOCUMENTS

| | | | |
|---|---|---|---|
| 6,377,181 B1 | 4/2002 | Kroll et al. ............ 340/604 |
| 6,895,572 B2* | 5/2005 | Miyata et al. ............ 717/100 |
| 7,038,470 B1 | 5/2006 | Johnson ............ 324/664 |
| 2002/0126005 A1 | 9/2002 | Hardman et al. ............ 340/442 |
| 2003/0093247 A1 | 5/2003 | Enea ............ 702/188 |
| 2003/0167139 A1 | 9/2003 | Swartz et al. ............ 702/65 |
| 2004/0102931 A1 | 5/2004 | Ellis et al. ............ 702/188 |
| 2005/0085248 A1 | 4/2005 | Balley et al. ............ 455/500 |
| 2005/0237160 A1 | 10/2005 | Nolan et al. ............ 340/10.33 |
| 2006/0197660 A1 | 9/2006 | Luebke et al. ............ 340/539.26 |
| 2006/0253598 A1* | 11/2006 | Nakamura et al. ............ 709/230 |
| 2006/0279628 A1* | 12/2006 | Fleming ............ 348/143 |
| 2007/0026107 A1* | 2/2007 | Wang et al. ............ 426/55 |
| 2007/0037567 A1* | 2/2007 | Ungless et al. ............ 455/422.1 |

OTHER PUBLICATIONS

MSP430×11×2, MSP430×12×2 Mixed Signal Microcontroller Product Specification, Texas Instruments, Inc. Aug. 2004, 39 pages.
nRF905 Single Chip 433/868/915 MHz Transceiver Product Specification, Nordic VLSI AS, Jan. 2004, 36 pages.

* cited by examiner

*Primary Examiner*—Julie Bichngoc Lieu
(74) *Attorney, Agent, or Firm*—Scot A. Reader

(57) ABSTRACT

Initialization of a sensor for monitoring the structural integrity of a building involves the sensor, a gateway and an installer device. An automated initialization brings the sensor online and enables the sensor for remote monitoring without requiring on-site manual configuration. Through the automated initialization, the sensor joins a logical communication group and a GPS location associated with the sensor becomes remotely accessible by a human network administrator.

27 Claims, 6 Drawing Sheets

INITIALIZATION OF A SENSOR FOR MONITORING THE STRUCTURAL INTEGRITY OF A BUILDING

CROSS REFERENCE TO RELATED APPLICATIONS

This application has subject matter related to the following U.S. nonprovisional applications, all having filing dates concurrent herewith, and all of which are incorporated herein by reference: Ser. No. 11/254,377 entitled "DIGITAL COMMUNICATION SYSTEM FOR MONITORING THE STRUCTURAL INTEGRITY OF A BUILDING AND SENSOR THEREFOR;" Ser. No. 11/254,408 entitled "REMOTE CONFIGURATION OF A SENSOR FOR MONITORING THE STRUCTURAL INTEGRITY OF A BUILDING;" Ser. No. 11/254,409 entitled "LINK ESTABLISHMENT IN A SYSTEM FOR MONITORING THE STRUCTURAL INTEGRITY OF A BUILDING" and Ser. No. 11/254,960 entitled "POWER CONSERVING SLEEP MODE FOR A SENSOR FOR MONITORING THE STRUCTURAL INTEGRITY OF A BUILDING."

BACKGROUND OF THE INVENTION

In recent years, moisture intrusion has become a more significant concern in facilities management. Moisture intrusion into building walls can result from the failure of weather resistive barriers that are improperly designed or installed, or that have been subjected to prolonged exposure to the elements. If left unchecked, moisture intrusion can lead to an array of serious problems, including mold, rot and structural instability. Business liability arising from moisture related problems has skyrocketed, to the point where many insurers have eliminated or restricted coverage for water damage in their policies.

Many moisture intrusion problems that eventually require expensive solutions are detectable through monitoring before they cause acute damage. One known monitoring solution is to install electrical moisture sensors in building walls and periodically test for moisture content. In U.S. Pat. No. 6,377,181, for example, it is described to embed multiple moisture sensors in walls and electrically connect them to a central control unit. The central control unit periodically sends an excitation voltage to each sensor and measures a voltage drop across the sensor, from which the central control unit directly calculates the wall's moisture content using a resistance curve.

This known solution is severely limited in terms of its information yield and overall sophistication. First, the sensors in the known solution are monolithic devices that are only capable of conveying one type of information, namely, a voltage drop indicative of moisture content. These prior art sensors are incapable of conveying information on other parameters indicative of structural integrity, such as temperature and humidity, or operational parameters, such as the sensor's location, operational state and the time of day.

Second, the sensors in this known solution are passive devices that are incapable of initiating information transfer. These sensors must wait to be driven by a periodic excitation voltage to send information to the central control unit. They are incapable, for example, of initiating transmission of an alarm notification to the central control unit upon detecting that a threshold for a parameter relevant to structural integrity has been surpassed.

Third, the sensors in this known solution are immutable devices that are not programmatically initializable, configurable or upgradeable. These sensors are not, for example, programmable to bring them online or specify the parameters relating to structural integrity to be monitored, or the operational parameters to be used in monitoring, such as measuring frequency, reporting frequency and alarm thresholds.

There is accordingly a need for a solution for monitoring structural integrity of a building that yields more information and provides a more advanced feature set.

SUMMARY OF THE INVENTION

In one aspect of the invention, a system and method for monitoring the structural integrity of a building is provided wherein the system and method comprise a sensor coupled to the building that communicates structural integrity information to a gateway via a digital communication link. The digital communication link is preferably a bidirectional wireless link that supports packetized data transfer between the sensor and the gateway. By supporting communication between the sensor and the gateway via a bidirectional digital communication link, the sensor is advantageously able to serve as a multidimensional device for reporting numerous types of structural integrity and operational information, an active device for initiating transfer of structural integrity and operational information, and a mutable device that is programmatically initializable, configurable and upgradeable to bring the sensor online and specify the parameters relating to structural integrity to be monitored and the operational parameters to be used in monitoring. Information and parameters relating to structural integrity (hereinafter "structural integrity information" and "structural integrity parameters," respectively) include, by way of example, information and parameters, respectively, relating to moisture content, humidity or temperature within a building envelope.

In another aspect of the invention, such a sensor is made operational by completing a fully automated initialization protocol involving the sensor, such a gateway and an installer device. Upon power up or reset of the sensor, the sensor establishes a first digital communication link with the installer device. Over the first digital communication link, the sensor learns first configuration information from the installer device. The sensor then establishes a second digital communication link with the gateway. Over the second digital communication link, the gateway learns the first configuration information from the sensor. The sensor then establishes a third digital communication link with the installer device. Over the third digital communication link, the installer device learns that the portion of the initialization protocol occurring between the sensor and the gateway was successful and outputs a success indication, such as an audible sound, to indicate successful initialization to a human installation technician. The first configuration information preferably includes a network identifier identifying the sensor with a logical group of devices, and global positioning system (GPS) coordinates identifying the approximate geographic location of the sensor. The gateway preferably passes via the Internet the first configuration information to a Web server accessible by a human network administrator for remotely monitoring the system. Through the expedient of this initialization protocol, the sensor is brought online and enabled for remote monitoring without requiring on-site manual configuration of the sensor.

In another aspect of the invention, such a sensor is configurable to report periodic and, optionally, event-driven structural integrity and operational information to such a gateway. Operational parameters stored on the sensor specify what structural integrity parameters to measure, how frequently to measure them, and how frequently to establish a digital communication link with the gateway allowing periodic interrogation of structural integrity information recorded by the sensor. Operational parameters stored on the sensor may also optionally specify alarm thresholds respecting one or more structural integrity parameters that are continuously monitored and which, if surpassed, cause the sensor to establish a digital communication link with the gateway enabling interstitial interrogation of structural integrity information recorded by the sensor.

In another aspect of the invention, such a gateway transmits configuration changes to such a sensor over such digital communication links established for interrogation of structural integrity information. Configuration changes are prompted by a human network administrator who may be remote from the gateway and sensors. Using a standard Web browser, the human network administrator preferably visits a system management Web site hosted on such a Web server and specifies the configuration changes to be made, the sensor or sensor group to which the changes are to apply and, in some embodiments, the time the changes are to become effective. The Web server thereafter instructs the gateway to implement changes to the sensors in the specified manner.

In another aspect of the invention, in intervals between monitoring and reporting of structural integrity information, such a sensor enters a power conserving sleep mode in which the supply of power is inhibited to nonessential functions, including sensing functions and radio functions. A real time clock on the sensor preferably prompts periodic wake up of the sensor from sleep mode, at which time the supply of power to the sensing functions and radio functions is resumed, if indicated, to perform monitoring and reporting of structural integrity information.

In another aspect of the invention, such digital communication links are established between such a sensor and installer device, and between such a sensor and gateway, using a frequency hopping spread spectrum (FHSS) hunt algorithm in which the sensor's role is limited, thereby minimizing the sensor's power consumption and extending its battery life.

These and other aspects of the invention will be better understood by reference to the following detailed description taken in conjunction with the drawings that are briefly described below.

DETAILED DESCRIPTION OF THE PREFERRED EMBODIMENT

I. System

Figure 1:
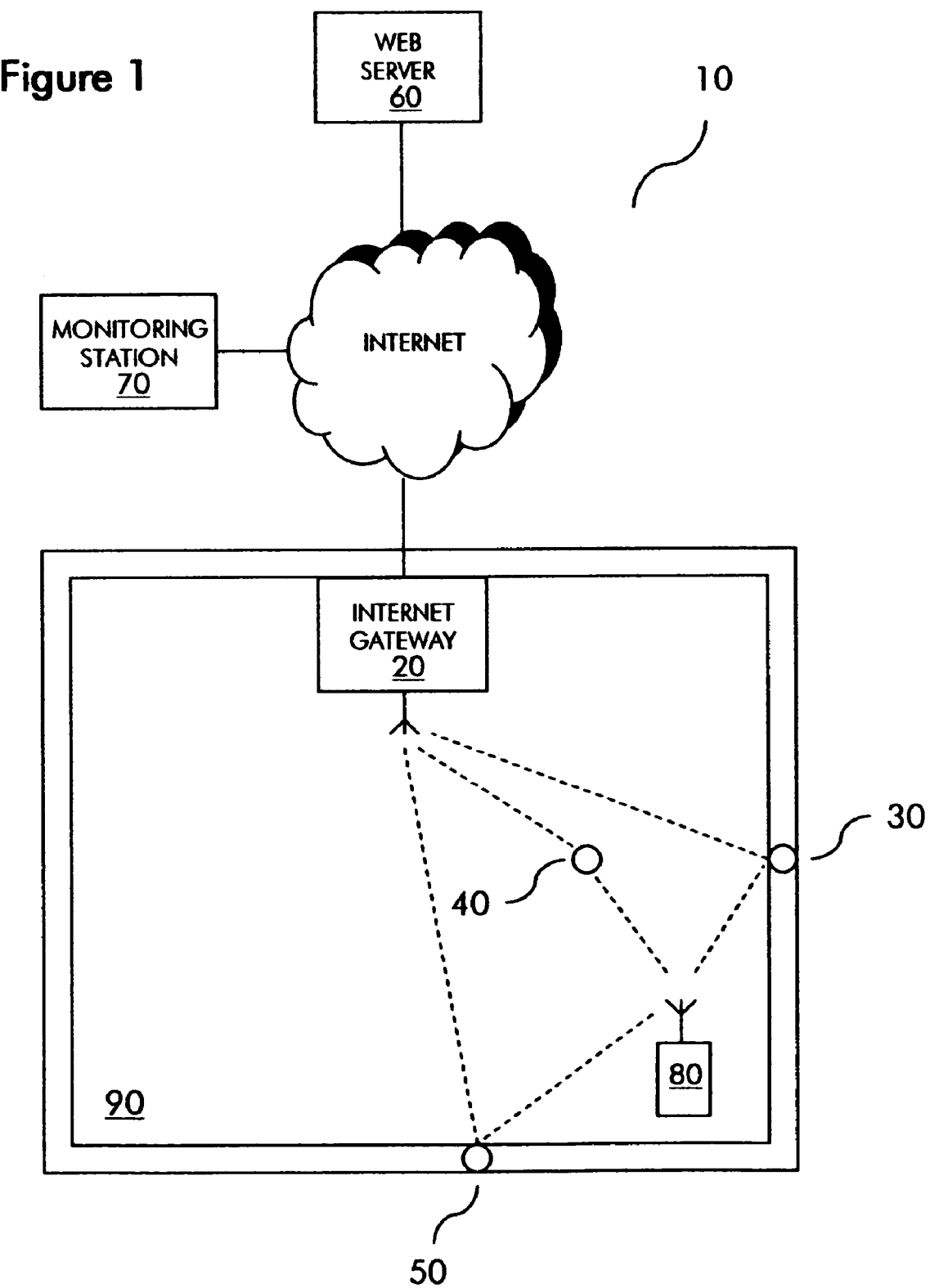
FIG. 1 is a block diagram of a system for monitoring the structural integrity of a building in a preferred embodiment of the invention.

Referring to FIG. 1, a system 10 for monitoring the structural integrity of a building is shown. System 10 includes an Internet gateway 20 interconnecting a multiple of sensors 30, 40, 50 embedded or mounted within a building envelope with a Web server 60 from which system 10 can be monitored by a human network administrator from a monitoring station 70 remote from sensors 30, 40, 50. System 10 also includes an installer 80, which is a handheld mobile device used by a human installation technician to initialize sensors 30, 40, 50. In the illustrated example, sensors 30, 50 are embedded in the walls of a building 90, which may be a commercial or residential structure, whereas sensor 40 is embedded in the floor. It will be appreciated, however, that sensors operative within the invention may be embedded in or mounted to any part of a building, including but not limited to walls, floors and roofs. Sensors 30, 40, 50 measure and record structural integrity information, such as moisture content, humidity and temperature information, proximate the location where they are embedded or mounted. Internet gateway 20 and sensors 30, 40, 50 communicate over digital communication links 90 established using a wireless local area network (LAN) protocol. Internet gateway 20 and Web server 60 communicate over a wired digital communication link using one or more Internet protocols, such as TCP/IP, Asynchronous Transfer Mode (ATM) or MPLS (Multiprotocol Label Switching). While one gateway 20 and three sensors 30, 40, 50 are shown in the example shown in FIG. 1, a system operative within the invention can include one or more sensors and one or more gateways.

II. Sensor

Figure 2:
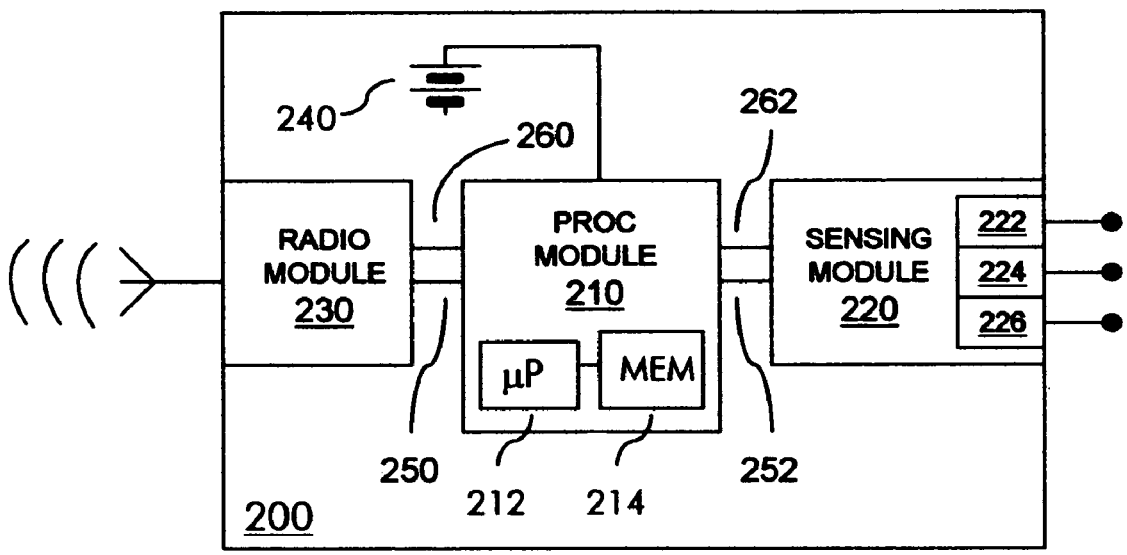
FIG. 2 is a block diagram of a sensor in the system of FIG. 1.

Turning to FIG. 2, a functional diagram of a representative one of sensors 30, 40, 50 is shown. Representative sensor 200 includes a processing module 210, a sensing module 220, a radio module 230 and a battery 240. Each module is preferably implemented in a distinct computer chip on a printed circuit board shared by all of the computer chips. Processing module 210 includes a microprocessor 212 and associated memory 214. Memory 214 stores a firmware image serving as the operating system for sensor 200, as well as operational parameters configured during manufacturing, initialization and updating of sensor 200 and structural integrity information collected by sensing module 220 during operation. Battery 240 is preferably an M sized lithium battery that powers processing module 210, sensing module 220 and radio module 230. Sensor 200 may take any of numerous physical shapes, such as cubical, spherical, cylindrical, conical or pyramidal.

A. Sensor Processing Module

Processing module 210 communicates with sensing module 220 and radio module 230 via sets of data pins 250, 252 and regulates the supply of power from battery 240 to sensing module 220 and radio module 230 via individual power pins 260, 262. With regard to power supply regulation, it is desirable to have a sensor that draws little power so that battery life is minimally impacted by the current that the sensor draws and the dominant factor in battery life is battery aging. This allows sensors to be embedded in areas that have limited or no access for maintenance after the sensor is initially installed, such as wall stud cavities, built-up roofs, and poured concrete slabs. Accordingly, between checks, monitoring and reporting, sensor 200 enters a low power sleep mode.

While in sleep mode, processing module 210 inhibits the supply of power to radio module 230 via power pin 262 and inhibits power to sensing module 220 via power pin 260. Power supply may also be inhibited to functions on processing module 210 except for a real time clock. The real time clock on processing module 210 initiates wake up of modules 220, 230 from sleep state to resume periodic monitoring and reporting, as indicated, and to interstitially report any alarm conditions. More particularly, if upon wake up the operative monitoring frequency indicates that it is time to monitor, power is resumed to sensing module 220 via power pin 260 to enable monitoring to be performed. If upon wake up the operative link establishment frequency indicates that it is time to report, or an alarm threshold has been surpassed, power is resumed to radio module 230 via power pin 262 to enable reporting to be performed. In some embodiments, the configured monitoring frequency and link establishment frequency are the same, such that inhibition and resumption of power to sensing module 220 and radio module 230 is synchronized in the absence of alarm conditions. Once the indicated monitoring and reporting are completed, the real time clock is reset and sleep mode is re-entered.

In alternative embodiments, monitoring of structural integrity parameters for which alarm thresholds are active is continuous, and consequently the supply of power to sensing module 220 is continuous if any alarm threshold is active. In still other embodiments, a sensing module is divided into multiple sub-modules, each having a distinct power pin, wherein in sleep mode power continues to be supplied to sub-modules that monitor structural integrity parameters associated with an active alarm threshold, but is inhibited to sub-modules that monitor structural integrity parameters that are not associated with an active alarm threshold. Moreover, in such embodiments, surpassing an alarm threshold triggers early wake up from sleep mode for reporting alarm conditions.

Numerous operational parameters are stored in memory 214. Such operational parameters include a sensor identifier (Sensor ID). The Sensor ID is a globally unique 32-bit address that is programmed into a flash memory portion of memory 214 during manufacturing of sensor 200. The Sensor ID is preferably in the format of "YDDDNNNNN" wherein YY is a decimal two-digit year from zero to 99, DDD is a decimal three-digit day of year ranging from zero to 364, NNNNN is a five-digit decimal serial number. The decimal number created by the above encoding is converted to hex and permanently stored in the flash memory portion.

Operational parameters also include an installer identifier (Installer ID). The Installer ID is a 32-bit address that is stored in the flash memory portion of memory 214 by installer 80 during initialization of sensor 200. Once learned from installer 80, the Installer ID is used by sensor 200 to identify a received packet as having originated from installer 80.

Operational parameters also include network identifiers (Network IDs). Network IDs are 32-bit addresses that are stored on memory 214. An installer Network ID is stored on sensor 200 during manufacturing to enable sensor 200 to initiate communication with an installer, such as installer 80. The installer Network ID is reserved for this purpose. Additionally, an operational Network ID is stored on sensor 200 by installer 80 during initialization of sensor 200. The operational Network ID is shared by a logical group of structural integrity monitoring and reporting devices operative within system 10 that includes sensor 200, zero or more other sensors, and one or more gateways. The operational Network ID enables sensor 200 to initiate communication with an in-range gateway that is within the logical device group of sensor 200 (and therefore with which sensor 200 is allowed to communicate), as distinct from an in-range gateway that is in a different logical device group (and therefore with which sensor 200 is not allowed to communicate). Network IDs permit multiple logical communication groups to operate independently within wireless range of one another. Network IDs also allow administrative policies to be applied to a group of sensors by reference to a single identifier. Processing module 210 posses appropriate Network IDs to radio module 230 for local storage and prepending to outbound packets.

Operational parameters also include a gateway identifier (Gateway ID). The Gateway ID is a 32-bit address stored in memory 214 by a gateway during initialization of sensor 200. Once learned from a gateway, the Gateway ID is used by sensor 200 to identify a received packet as having originated from a particular in-range gateway that is within the logical device group of sensor 200. In this regard, in a given building multiple gateways having the same Network ID as sensor 200 may be active within the range of sensor 200. Gateway ID allows sensor 200 to distinguish between such gateways during operation in order to maintain session persistence.

For the remainder of this detailed description, it is assumed that sensors 30, 40, 50 (including representative sensor 200), and gateway 20 share a Network ID and, as a result, form a logical group of devices within system 10.

Operational parameters also include GPS coordinates. GPS coordinates are stored on memory 214 by installer 80 during initialization of sensor 200. Gateway 20 then reads the GPS coordinates and transfers them to Web server 60 where the position information is maintained in database records associated with sensor 200. Thus, when gateway 20 notifies Web server 60 of a problem reported by sensor 200, the human network administrator can pinpoint the geographic coordinates of sensor 200 and locate the problem. Sensor 200 is preferably powered up or reset near the location it is to be installed in order to ensure a high level of accuracy of the GPS coordinates stored to memory 214.

Operational parameters also include a monitoring frequency, which indicates how frequently sensor 200 measures structural integrity parameters and records structural integrity information to memory 214. A default monitoring frequency may be stored to memory 214 during manufacturing, and later updated by gateway 20.

Operational parameters also include a link establishment frequency, which indicates how frequently sensor 200, in the absence of an alarm condition, establishes a digital communication link with gateway 20 for interrogation of structural integrity information recorded by sensor 200. A default link establishment frequency may be stored on memory 214 during manufacturing, and later updated by gateway 20.

Operational parameters may also include a monitored parameter list. A monitored parameter list may be in the form of a bit mask that specifies which of the several structural integrity parameters sensor 200 is capable of monitoring are presently enabled for monitoring. For example, the monitored parameter list may consist in a three-bit mask wherein the individual bits indicate whether monitoring of moisture content, humidity and temperature, respectively, are presently enabled. A default monitored parameter list may be stored on memory 214 during manufacturing, and later updated by gateway 20.

Operational parameters may also include alarm thresholds. Alarm thresholds specify limits for particular monitored structural integrity parameters that, if exceeded, trigger establishment of a digital communication link with gateway 20 for interstitial interrogation of structural integrity information recorded by sensor 200. Default alarm thresholds may be stored on memory 214 during manufacturing, and later updated by gateway 20.

During initialization, reporting and updating operations conducted over established digital communication links, gateway 20 and/or installer 80 remotely control access to memory 214 by transmitting packetized direct memory access (DMA) commands to sensor 200. Segments in memory 214 are mapped to particular functions so that gateway 20 and installer 80 can read or write information by issuing and transmitting to sensor 200 a DMA command that specifies read or write, the memory segment, and the information to be written (in the case of a write command). In response to DMA commands, microprocessor 212 either writes the information to the specified memory segment or reads information from the specified segment and transmits any read information to the issuing one of gateway 20 or installer 80. To support writing to the flash memory portion of memory 214, the write command has an "erase before write" option that instructs to erase the flash segment prior to writing the information.

The initial firmware image that serves as the operating system for sensor 200 is programmed into a flash memory portion of memory 214 during manufacturing. Replacement firmware images, such as maintenance releases and upgrades, are written in the flash memory portion of memory 214 by gateway 20 using packetized DMA commands. The flash memory portion of memory 214 is partitioned into two sections. When gateway 20 issues a DMA command to write a replacement firmware image, the replacement firmware image is written into the currently unused section of the flash memory, and a program counter on microprocessor 212 is written to force execution of the replacement firmware image. The replacement image then self-checks to make sure it is not corrupted by doing a cyclic redundancy check (CRC) over the full image. If the CRC fails, the replacement image forces a firmware reboot to the previous image. If the CRC passes, the replacement image copies its interrupt vectors to memory 214 so that the replacement image will thereafter execute upon firmware reboot, and forces a firmware reboot to the replacement image. Gateway 20 learns of CRC failures through current firmware version information in packets transmitted by sensor 200 and re-attempts firmware replacement using packetized DMA commands upon learning of such failures.

B. Sensing Module

Sensing module 220 performs sensing functions for sensor 200. Sensing module 220 includes probes for measuring structural integrity parameters as instructed by processing module 210 and supplying structural integrity information resulting from such measurements to processing module 210. Probes include a moisture content probe 222, a humidity probe 224 and a temperature probe 226. Moisture content probe 222 preferably includes a circuit for making and performing analog-to-digital conversion of dual voltage measurements indicative of the moisture content of the wall, roof or floor proximate sensor 200. Processor module 210 stores the digitized moisture content information that is output by moisture content probe 222 in memory 214. Sensor 200 transmits the moisture content information to gateway 20 during interrogation by gateway 20, and gateway 20 relays the information to Web server 60. In some embodiments, moisture content information includes dual voltage measurements made by probe 222 and Web server 60 calculates the moisture content of the wall, roof or floor proximate to sensor 200 by reference to the dual voltage measurements. In those embodiments, Web server 60 calculates an RC time constant from the measurements and calculates the moisture content from a known relationship with the RC time constant. In other embodiments, a moisture content probe may be implemented as a "Wheatstone bridge" circuit whose voltage varies with the resistance of the wall, roof or floor under test.

Humidity probe 224 preferably includes a circuit for making and performing analog-to-digital conversion of relative humidity measurements. In some embodiments, probe 224 utilizes a capacitive polymer sensing element in making such measurements. Temperature probe 226 preferably includes a circuit for making and performing analog-to-digital conversion of temperature measurements. In some embodiments, temperature probe 226 utilizes a bandgap temperature sensor in making such measurements. An integrated humidity/temperature sensor, such as the SHT11 digital humidity and temperature sensor marketed by Sensirion AG, may be employed as probes 224, 226. Relative humidity and temperature information returned to processing module 210 from probes 224, 226 is stored in memory 214 until interrogation by gateway 20.

C. Sensor Radio Module

Radio module 230 provides wireless transceiver functions for a connection oriented wireless LAN communication protocol that enables sensor 200 to communicate with installer 80 and gateway 20. Features of the wireless LAN communication protocol include wireless link establishment and tear-down and packet formatting. It will be appreciated that these protocol features may be performed by processing module 210, with radio module 230 supporting processing module 210 with necessary transceiver functions.

In wireless link establishment, sensor 200 establishes wireless links with installer 80 and gateway 20 by assuming the link slave role in a low power FHSS hunt protocol. Sensor 200 assumes the link slave role on power up and reset to establish a digital communication link first with installer 80 and then gateway 20 for initialization. Sensor 200 also assumes the link slave role when reporting is indicated by the link establishment frequency or an alarm condition to establish a digital communication link with gateway 20 for interrogation of structural integrity information. The FHSS hunt protocol is preferably implemented on processing module 210 under firmware control.

In packet formatting, sensor 200 packetizes information for transmission into fixed length packets, and prepends to each fixed length packet a header having a source address field, a destination address field and a Network ID field. Each packet is preferably 32 bytes in length. The Sensor ID of sensor 200 is inserted in the source address field. The installer Network ID is inserted into the Network ID field when communicating with installer 80 and the Installer ID of installer 80, once known, is inserted into the destination address field when communicating with installer 80. The operational Network ID of gateway 20 is inserted into the Network ID field and the Gateway ID of gateway 20, once known, is inserted into the destination address field when communicating with gateway 20. Packet formatting is preferably implemented on processing module 210 under firmware control, except that radio module 230 maintains and prepends appropriate Network IDs on packets.

III. Gateway

Figure 3:
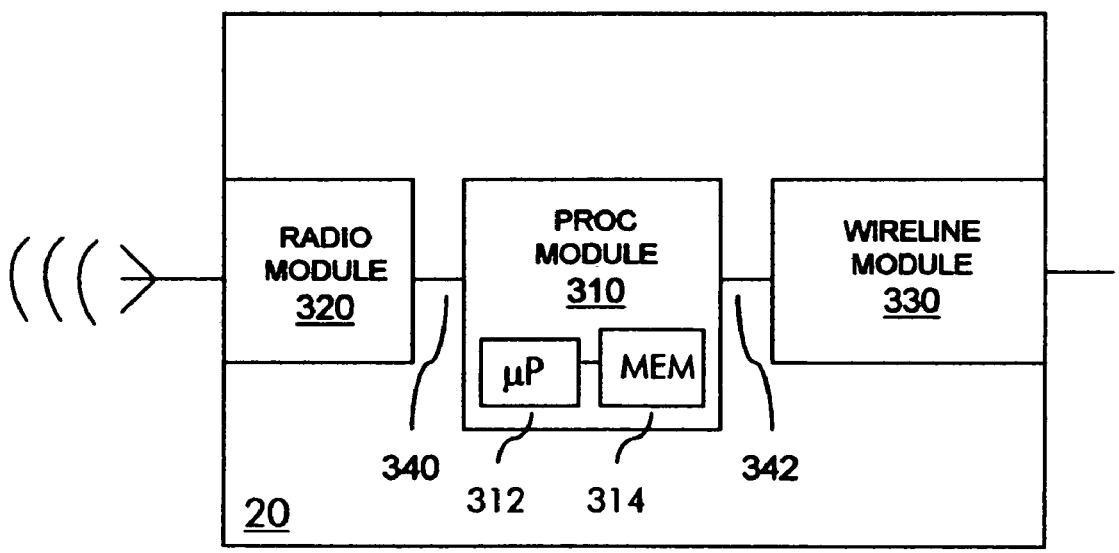
FIG. 3 is a block diagram of gateway in the system of FIG. 1.

FIG. 3 shows gateway 20 in more detail. Gateway 20 includes a processing module 310, a radio module 320 for communicating with sensors 30, 40, 50 and a wireline module 330 for communicating with Web server 60. Gateway 20 is powered either through an external AC power cord or inline power supplied via wireline module 330. Processing module 310 includes a microprocessor 312 and memory 314. Memory 314 stores a firmware image serving as the operating system for gateway 20, operational parameters configured during manufacturing, initialization and configuration of gateway 20, configuration information received from Web server 60 awaiting local application or downloading to sensors 30, 40, 50 and structural integrity information collected from sensors 30, 40, 50 awaiting uploading to Web server 60. Processing module 310 communicates with radio module 320 and wireline module 330 via sets of data pins 340, 342.

Operational parameters stored on memory 314 include the Gateway ID assigned to gateway 20, the operational Network ID of the logical group of devices to which gateway 20 belongs, and an address of Web server 60 which may be, for example, an IP address. In other embodiments, the address of Web server 60 may be stored on wireline module 330. Gateway 20 preferably does not maintain a list of sensors active within its logical communication group. It can be safely assumed that if a sensor is using a Network ID that matches the gateway's Network ID then that sensor is a member of the gateway's logical communication group.

Radio module 320 provides wireless transceiver functions for a connection oriented wireless LAN communication protocol that enables gateway 20 to communicate with sensors 30, 40, 50. Features of the wireless LAN communication protocol include wireless link establishment and tear down and packet formatting. It will be appreciated that these protocol features may be performed by processing module 310, with radio module 320 supporting processing module 310 with necessary transceiver functions.

Gateway 20 establishes wireless links with sensors 30, 40, 50 by assuming the link master role in the FHSS hunt protocol. Gateway 20 assumes the link master role on power up to announce its readiness to establish digital communication links with sensors 30, 40, 50. The FHSS hunt protocol is preferably implemented on processing module 310 under firmware control.

Wireline module 330 provides an Ethernet interface for maintaining an "always on" broadband Internet connection to Web server 60, as well as a PSTN interface with a dial up modem for establishing intermittent dial up connections to Web server 60. In some embodiments, wireline module 330 includes an embedded Web server supporting Layer 2 and Layer 3 functions, such as TCP/IP and DHCP, and storing the IP address of Web server 60.

IV. Installer

Installer 80 is a handheld mobile device having a processing module, a radio module for communicating with sensors 30, 40, 50, a wireline module for receiving configuration information from a PC over a serial interface such as an RS-232 interface, and a speaker for making an audible sound to notify a human installation technician of successful initialization of sensors 30, 40, 50. Installer 80 is preferably powered by AA sized batteries. The processing module on installer 80 has a processor and a memory storing a firmware image serving as the operating system for installer 80 and operational parameters configured during manufacturing and configuration of installer 80 and awaiting local application or downloading to sensors 30, 40, 50. Operational parameters stored on installer 80 include the Installer ID assigned to installer 80, the installer Network ID, and the operational Network ID of the logical group of devices to which the sensors that installer 80 is responsible for initializing belong.

The radio module on installer 80 provides wireless transceiver functions for a connection oriented wireless LAN communication protocol that enables installer 80 to communicate with sensors 30, 40, 50. Features of the wireless LAN communication protocol include wireless link establishment and tear down and packet formatting. These protocol features may be performed by the processing module with the radio module supporting the processing module with necessary transceiver functions.

Installer 80 establishes wireless links with sensors 30, 40, 50 by assuming the link master role in the FHSS hunt protocol. Installer 80 assumes the link master role on power up to announce its readiness to establish digital communication links with sensors 30, 40, 50. The FHSS hunt protocol is preferably implemented on the processing module under firmware control.

After configuration of installer 80 by a PC over the serial interface of the wireline module, a GPS receiver (not shown) can be attached to the serial interface on installer 80 to receive GPS coordinates from an external GPS. This enables installer 80 to provide an approximate GPS location to sensors 30, 40, 50 during initialization of sensors 30, 40, 50.

The speaker is operatively coupled to the processing module of installer 80 and is selectively driven by the processing module to sound a series of rapid beeps at the same pitch to indicate successful initialization of a sensor.

V. FHSS Hunt Protocol

Figure 4:
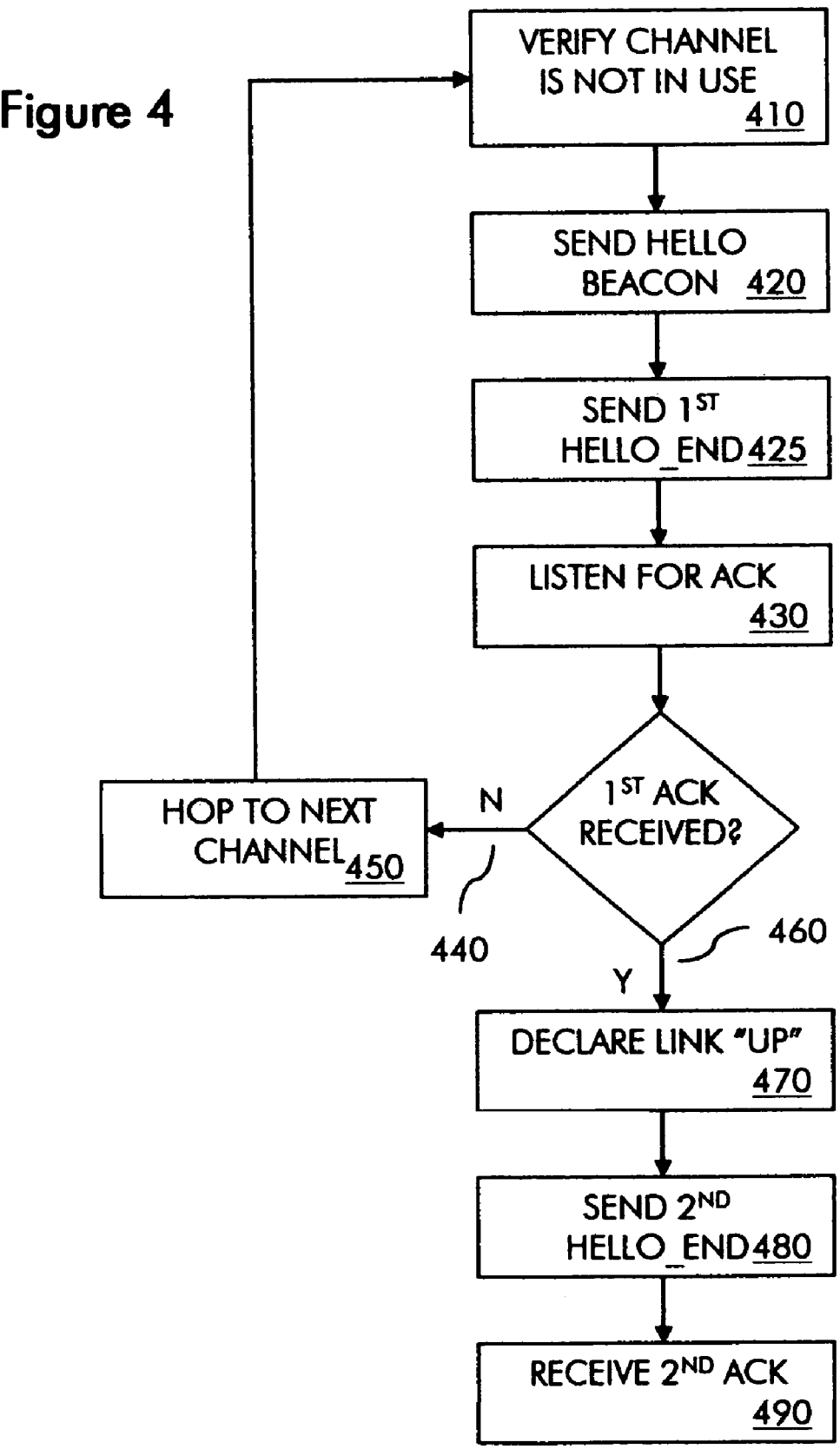
FIG. 4 is a flow, diagram describing, from the perspective of the installer and gateway of FIG. 1, a FHSS hunt protocol for establishing a digital communication link in the system of FIG. 1.

FIG. 4 is a flow diagram describing the FHSS hunt protocol from the perspective of the link master, for example, gateway 20 or installer 80. In a preferred embodiment, the FHSS hunt protocol uses 127 unique channels in the 902 to 928 MHz frequency band to allow many devices to communicate at the same time without significant signal interference. The channels are chosen pseudo-randomly. Since under the FHSS protocol the link master listens and transmits continuously, whereas the link slave only listens and transmits selectively, gateway 20 and installer 80 are configured as FHSS link masters, whereas sensors 30, 40, 50 are configured FHSS link slaves, to conserve the battery life of sensors 30, 40, 50.

The link master, for example, gateway 20 or installer 80, listens to a channel to verify that it is currently not in use (410). The link master then transmits a HELLO beacon for approximately 50 ms (420), then sends a HELLO_END packet to signal the end of the beacon transmission (425), and then listens for approximately four ms for an ACK packet type from any sensor that heard the beacon (430). The HELLO_END packet contains information sufficient to identify the link master and the channel number the link master is transmitting on. The channel number is transmitted because it is possible for a sensor to receive a packet on a channel different from that on which it was sent. If no ACK response is received (440), the link master hops to the next channel (450) and repeats the process.

If the link master receives the ACK to its current HELLO_END (460), it knows that the link slave, for example, sensor 200, can hear it and that it can hear the link slave. Based on that knowledge, the link master declares the link state to be "up" (470). The link slave, however, does not yet know if the link master heard its ACK, so the link master sends a second HELLO_END specifically addressed to the link slave to let the slave know that it heard its ACK packet (480). When the link slave receives this second HELLO_END, it knows that the link master can hear it and it declares its link state to be "up". The process of opening a communication session between the link master and link slave is completed when the link slave ACKs the second HELLO_END packet (490).

Figure 5:
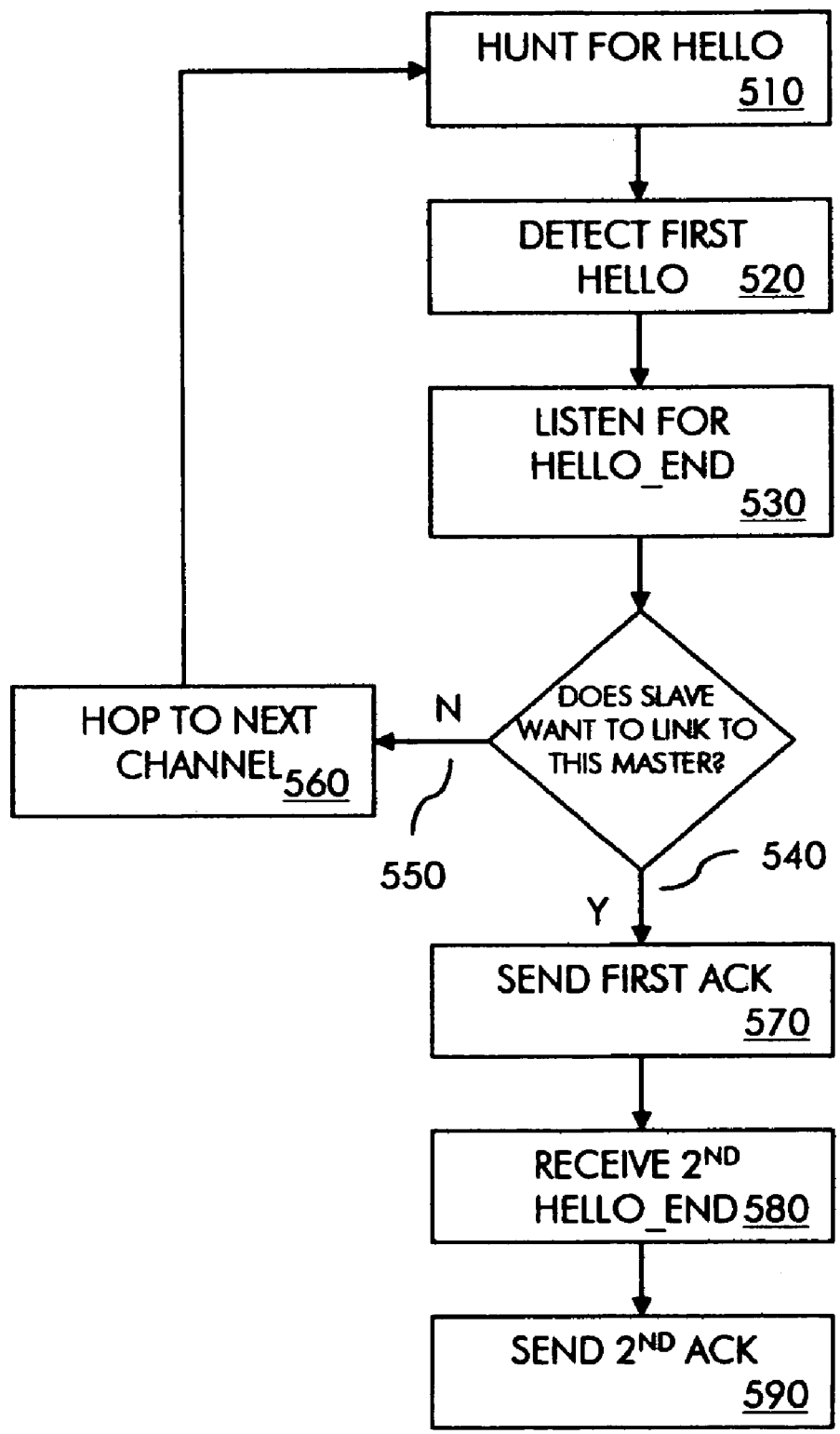
FIG. 5 is a flow diagram describing, from the perspective of a sensor of FIG. 1, a FHSS hunt protocol for establishing a digital communication link in the system of FIG. 1.

FIG. 5 is a flow diagram describing the FHSS hunt protocol from the perspective of the link slave, for example, sensor 200. When the link slave wishes to establish a digital communication link, the link slave hunts for the beacon HELLO packet that the link master is continuously broadcasting (510). It does this by listening for a carrier for approximately one ms on every channel in sequence using the same pseudo-random sequence as the link master. If a carrier is detected on a channel (520), the slave continues to listen to the channel to try and receive a HELLO_END packet (530). After the slave has received a HELLO_END packet, the slave checks to ensure that the packet is from a link master with which link slave wishes to establish a digital communication link. If it is (540), the link slave transmits an ACK packet type back to the link master containing information sufficient to identify the link slave (570). Since the slave knows the link master's identity from the HELLO_END packet, the ACK is specifically addressed to the link master that originated the HELLO_END packet. The slave subsequently receives a second HELLO_END (580) and sends a second ACK (590) to complete the process. If the HELLO_END packet is not from a link master with which the link slave wishes to establish a digital communication link (550), the link slave hops to the next channel (560) and repeats the process.

The link master and link slave use the same seven bit linear feedback shift register to generate a pseudorandom hop sequence.

VI. Initialization

Figure 6:
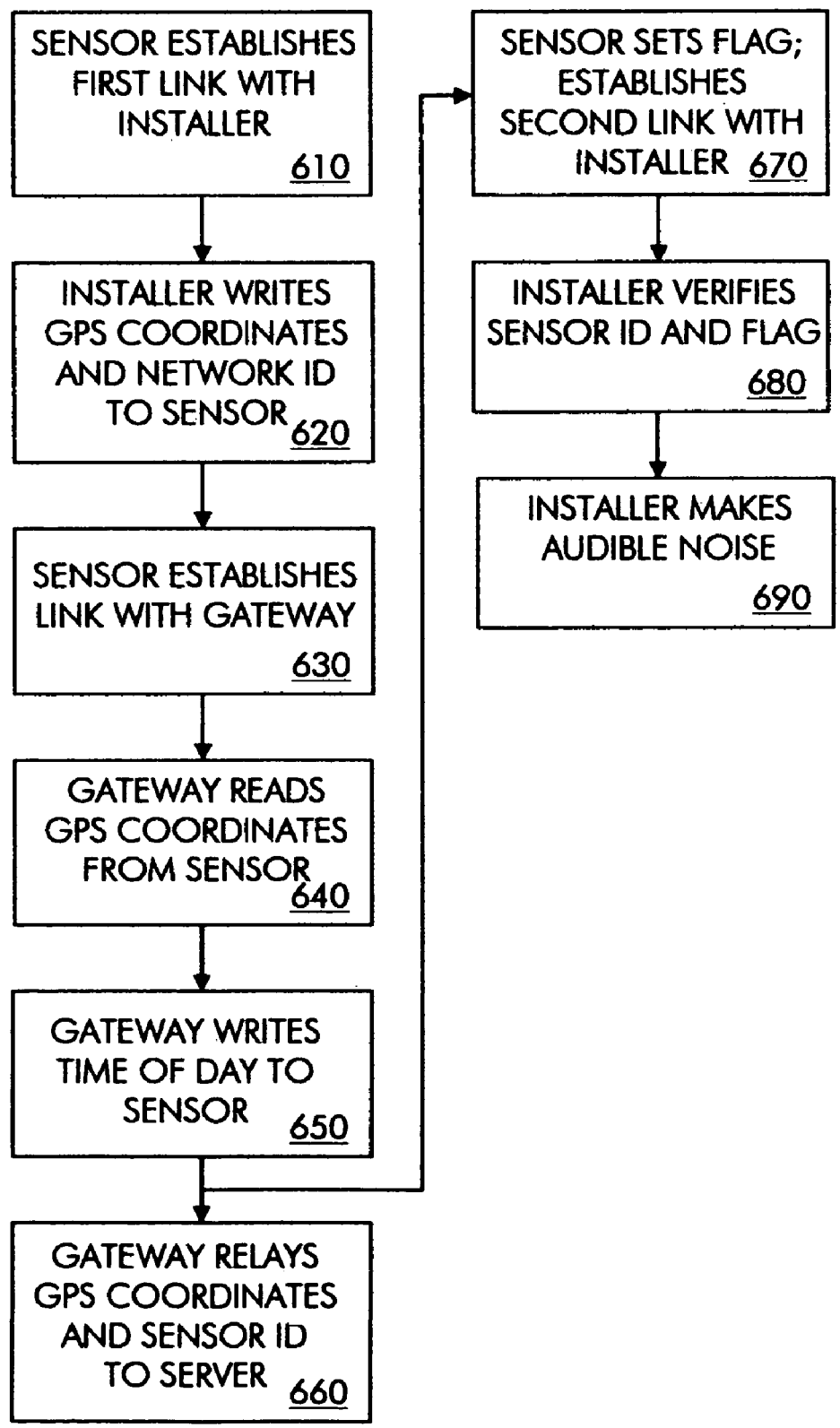
FIG. 6 is a flow diagram describing sensor initialization in the system of FIG. 1.

FIG. 6 is a flow diagram describing a sensor initialization protocol in the system of FIG. 1. Sensor 200, which is a representative one of sensors 30, 40, 50, is made operational by completing an initialization protocol involving sensor 200, gateway 20 and installer 80. Upon power up or reset, the firmware image on sensor 200 invokes radio module 230 to establish a digital communication link with installer 80 using the installer Network ID and the FHSS hunt protocol (610). Installer 80 is preferably GPS-enabled at this point. Once the link is established, installer 80 waits for the next valid position to be output from the GPS, and then writes the GPS coordinates and the operational Network ID of the logical communication group in which sensor 200 will participate to sensor 200 using a DMA write command (620). Installer 80 then closes its session with sensor 200, but remembers the Sensor ID transmitted by sensor 200.

Sensor 200 then opens a communication session with gateway 20 using the learned operational Network ID and the previously described FHSS hunt protocol (630). Gateway 20 reads the GPS coordinates of sensor 200 using a DMA read command (640) and writes the time of day to sensor 200 using a DMA write command (650). Gateway 20 sends the GPS coordinates to Web server 60 in association with the Sensor ID transmitted by sensor 200 (660). Gateway 20 ends the communication session with sensor 200.

At that point, sensor 200 sets a "registered" flag in memory 214 indicating it was able to talk to gateway 20. Sensor 200 then establishes another digital communication link with installer 80 using the Installer ID learned in the previous communication with installer 80 and the previously described FHSS hunt protocol (670). Installer 80 verifies that the "registered" flag is set and that the Sensor ID transmitted by sensor 200 matches the remembered Sensor ID from the previous session (680). Installer 80 then sounds a series of rapid beeps at the same pitch indicating successful initialization of sensor 200 (690). In alternative embodiments, sensors may be equipped with their own beepers or LEDs; however, it bears noting that such beepers or LEDs consume extra power on such sensors.

VII. Reporting

Figure 7:
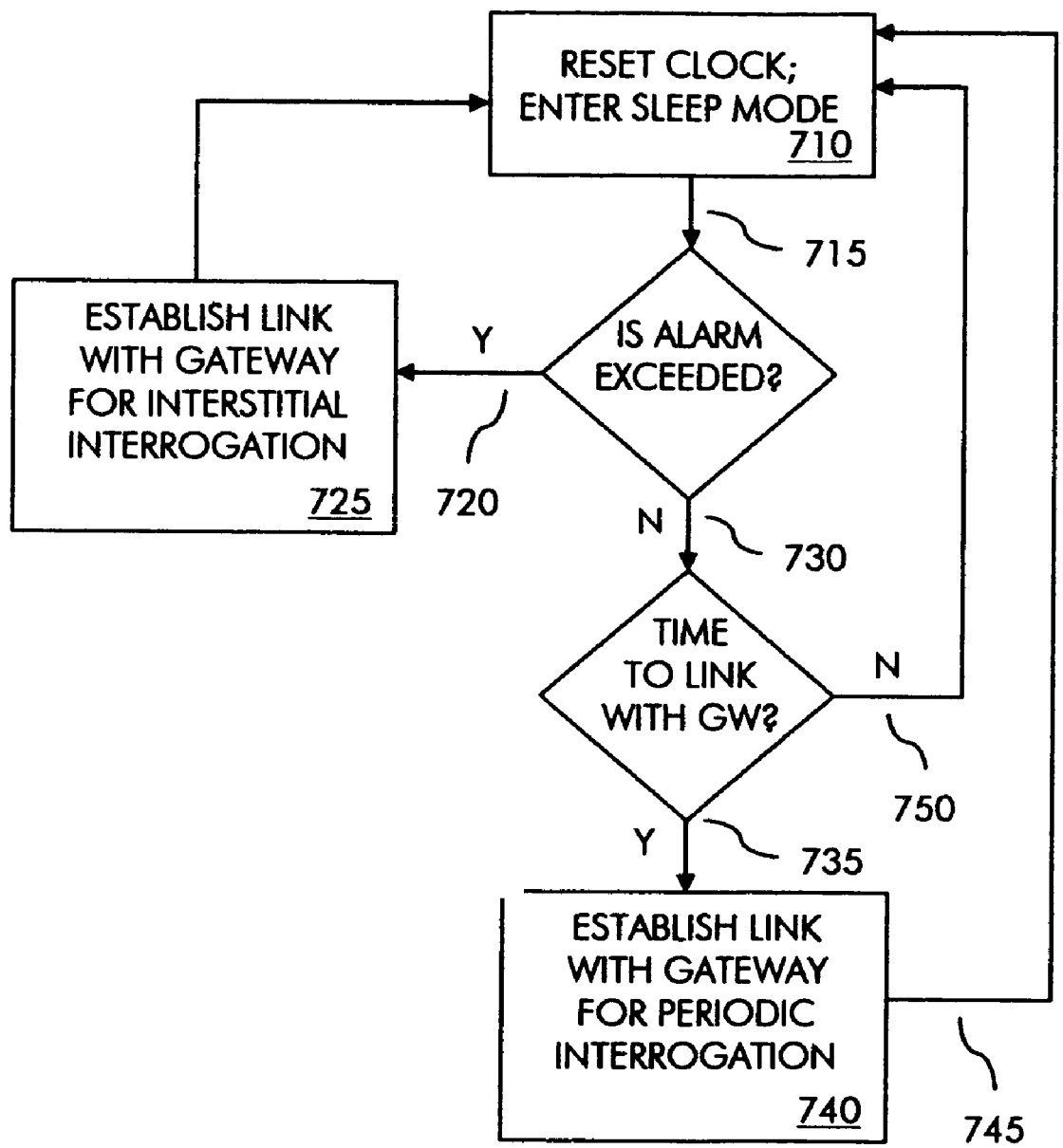
FIG. 7 is a flow diagram describing sensor reporting in the system of FIG. 1.

FIG. 7 is a flow diagram describing sensor reporting within the system of FIG. 1. In operation, sensor 200 reports periodic and, optionally, event driven structural integrity and operational information to gateway 20. After initialization, sensor 200 enters sleep mode and the real time clock on processing module 210 is reset (710). Sensor 200 wakes up when the timer expires (715) and monitors structural integrity information if the time for monitoring is indicated by the monitoring frequency on memory 214. Sensor 200 then determines if an alarm threshold has been surpassed. If so (720), sensor 200 establishes a link with gateway 20 using the FHSS hunt protocol for reporting structural integrity information via interstitial interrogation (725). Interrogation is achieved through the issuance by gateway 20 of packetized DMA read commands and the fulfillment by sensor 200 of those commands. After such interrogation, sensor 200 returns to sleep mode and the real time clock is reset. If no alarm threshold has been exceeded (730) but the link establishment frequency indicates time to report (735), sensor 200 establishes a link with gateway 20 using the FHSS hunt protocol for reporting structural integrity information via periodic interrogation (740) prior to returning to sleep mode and resetting the real time clock (745). If the link establishment frequency does not indicate time to report (750), sensor 200 returns to sleep mode and the real time clock is reset without interrogation. Of course, in some embodiments there are no alarm thresholds. In embodiments without alarm thresholds, the step indicating to check whether an alarm is exceeded is bypassed.

Gateway 20 relays learned structural integrity information to Web server 60 in periodic or event driven reports using a known address of Web server 60, such as an IP address. In some embodiments, structural integrity information is transmitted to Web server 60 over an "always on" broadband Internet connection. In other embodiments, gateway 20 relies on a dial up Internet connection. In dial up embodiments, gateway 20 stores the structural integrity information in a local cache for a time before periodically dialing up the Internet service and uploading the information to Web server 60. However, gateway 20 also maintains local alarm thresholds that trigger immediate dial up of Web server 60 if exceeded. Moreover, in dial up embodiments, gateway 20 preferably receives power from the phone line to render system 10 invulnerable to AC power outages within building 90.

VIII. Configuration Changes

Gateway 20 also utilizes digital communication links established for interrogation to transmit configuration changes to sensor 200. Whenever sensor 200 establishes a digital communication link with gateway 20 for interrogation of structural integrity information, gateway 20 may, in addition to interrogating sensor 200 for structural integrity information using DMA read commands, issue DMA write commands to sensor 200 that cause sensor 200 to store configuration changes in specified segments of memory 214. In some embodiments, configuration changes are written during the first interrogation after receipt of the configuration information from Web server 60. In other embodiments, configuration changes are written during an interrogation that is at or near a time specified by the human network administrator, and during the first interrogation after receipt of the configuration information if no time is specified. In either case, gateway 20 advantageously puts into dual use preexisting digital communication links between gateway 20 and sensors 30, 40, 50 that are established independently of configuration changes.

The human network administrator preferably initiates configuration changes to gateway 20 and sensor 200 from a standard Web browser on monitoring station 70. The human network administrator preferably visits a system management Web site hosted on Web server 60 and inputs information sufficient to identify the configuration changes to be made, the target device and, in some embodiments, the time the changes are to become effective. Web server 60 generates a command that describes the change (i.e. sensor or gateway, firmware or other configuration change) and target device (i.e. gateway 20, sensor 200 or sensor group 30, 40, 50). In response to a next contact by gateway 20 pursuant to an upload of structural integrity information or a "server ping" initiated by gateway 20 after a period of inactivity, Web server 60 instructs gateway 20 to implement the specified changes at the specified time, if any.

It will be appreciated by those of ordinary skill in the art that the invention can be embodied in other specific forms without departing from the spirit or essential character hereof. As one of numerous examples, rather than continuous remote monitoring of gateway 20 over the Internet, "on demand" local monitoring may be conducted by plugging a PC into the Ethernet interface on gateway 20 and retrieving structural integrity information cached by gateway 20. The present description is therefore considered in all respects to be illustrative and not restrictive. The scope of the invention is indicated by the appended claims, and all changes that come within the meaning and range of equivalents thereof are intended to be embraced therein.

I claim:

1. An initialization method for a sensor for monitoring structural integrity of a building, comprising:

communicating to the sensor from an installer device first configuration information;

communicating to a gateway from the sensor the first configuration information;

communicating to the installer device from the sensor first success information indicative of a successful communication between the sensor and the gateway; and outputting by the installer device second success information indicative of a successful initialization of the sensor.

2. The initialization method of claim 1, wherein the second success information is an audible sound.

3. The initialization method of claim 1, wherein the first configuration information includes a network identifier associating the sensor with a logical group of devices.

4. The initialization method of claim 1, wherein the first configuration information includes OPS coordinates identifying an approximate geographic location of the sensor.

5. The initialization method of claim 1, wherein the gateway communicates to a Web server the first configuration information.

6. The initialization method of claim 1, wherein the transmitting and receiving steps are performed over digital communication links.

7. The initialization method of claim 6, wherein the digital communication links are wireless links.

8. The initialization method of claim 1, wherein the first success information includes an identifier of the sensor and a flag indicative of the successful communication between the sensor and the gateway.

9. An initialization method for a sensor for monitoring structural integrity of a building, comprising:

writing by an installer device to the sensor first configuration information;

reading by a gateway from the sensor the first configuration information;

reading by the installer device from the sensor first success information indicative of a successful communication between the sensor and the gateway; and outputting by the installer device second success information indicative of a successful initialization of the sensor.

10. The initialization method of claim 9, wherein the second success information is an audible sound.

11. The initialization method of claim 9, wherein the first configuration information includes a network identifier associating the sensor with a logical group of devices.

12. The initialization method of claim 9, wherein the first configuration information includes GPS coordinates identifying an approximate geographic location of the sensor.

13. The initialization method of claim 9, wherein the gateway communicates to a Web server the first configuration information.

14. The initialization method of claim 9, wherein the writing step is performed using a direct memory access (DMA) write command.

15. The initialization method of claim 9, wherein the first and second reading steps are performed using DMA read commands.

16. The initialization method of claim 9, wherein the first success information includes an identifier of the sensor and a flag indicative of the successful communication between the sensor and the gateway.

17. An installer device for facilitating initialization of a sensor for monitoring structural integrity of a building, the installer device having instructions executable by a processor for performing steps comprising:

transmitting first configuration information to the sensor for storing on the sensor and further transmission to a gateway;

receiving first success information from the sensor indicative of a successful communication between the sensor and the gateway; and outputting second success information indicative of a successful initialization of the sensor.

18. The installer device of claim 17, wherein the second success information is an audible sound.

19. The installer device of claim 17, wherein the first configuration information includes a network identifier associating the sensor with logical group of devices.

20. The installer device of claim 17, wherein the first configuration information includes GPS coordinates identifying an approximate geographic location of the sensor.

21. The installer device of claim 17, wherein the gateway communicates to a Web server the first configuration information.

22. The installer device of claim 17, wherein the transmitting and receiving steps are performed over digital communication links.

23. The installer device of claim 22, wherein the digital communication links are wireless links.

24. The installer device of claim 17, wherein the first success information includes an identifier of the sensor and a flag indicative of the successful communication between the sensor and the gateway.

25. An installer device for facilitating initialization of a sensor for monitoring structural integrity of a building, the installer device having a instructions executable by a processor for performing steps comprising:

transmitting a network identifier to a sensor;

receiving first success information from the sensor indicative of a successful communication between the sensor and a gateway associated with the network identifier; and outputting second success information indicative of a successful initialization of the sensor.

26. The installer device of claim 25, wherein the successful initialization comprises joining a logical communication group associated with the network identifier.

27. A method for facilitating initialization of a sensor, comprising the steps of:

transmitting a network identifier to a sensor;

receiving first success information from the sensor indicative of a successful communication between the sensor and a gateway using the network identifier; and outputting second success information indicative of a successful initialization of the sensor.

* * * * *